United States Patent
Yoshida

(10) Patent No.: US 6,597,474 B1
(45) Date of Patent: Jul. 22, 2003

(54) IMAGE DATA TRANSMISSION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/324,050

(22) Filed: Jun. 2, 1999

Related U.S. Application Data

(62) Division of application No. 08/544,066, filed on Oct. 17, 1995, now Pat. No. 6,005,672.

(30) Foreign Application Priority Data

Nov. 8, 1994 (JP) .............................. 6-273605

(51) Int. Cl.⁷ .............................. H04N 1/00; H04N 1/40
(52) U.S. Cl. ........................ 358/439; 358/444; 358/434; 358/436; 358/451
(58) Field of Search ................................ 358/439, 434, 358/412, 444, 468, 449, 451, 448, 404, 442, 436, 435, 438

(56) References Cited

U.S. PATENT DOCUMENTS

| 4,814,894 A | 3/1989 | Yoshida ...................... 358/298 |
| 4,827,349 A | 5/1989 | Ogata et al. ................ 358/434 |
| 4,855,839 A | 8/1989 | Saito ........................... 358/296 |
| 4,870,501 A | 9/1989 | Yoshida ...................... 358/447 |
| 5,075,783 A | 12/1991 | Yoshida et al. ............. 358/439 |
| 5,121,221 A | 6/1992 | Hamano et al. ............. 358/426 |
| 5,438,436 A | 8/1995 | Harris ........................ 358/500 |
| 5,521,720 A | 5/1996 | Yoshida ...................... 358/448 |
| 5,566,003 A | 10/1996 | Hara et al. .................. 358/448 |
| 5,627,650 A | 5/1997 | Nosaki et al. ............. 358/296 |
| 5,677,773 A | * 10/1997 | Sakayama et al. .......... 358/403 |
| 5,896,207 A | * 4/1999 | Tomida ...................... 358/537 |
| 5,995,242 A | * 11/1999 | Izumisawa et al. ......... 358/434 |
| 6,002,490 A | * 12/1999 | Suzuki ........................ 358/434 |
| 6,049,398 A | * 4/2000 | Tanimoto .................... 358/442 |

* cited by examiner

Primary Examiner—Cheukfan Lee
(74) Attorney, Agent, or Firm—Fitzpatrick, Cella, Harper & Scinto

(57) ABSTRACT

An image data transmission apparatus reads image data from a document placed on a document tray via a line sensor or the like, and transmits the obtained image data to a receiving apparatus either after rotation of the image data or without rotation of the image data wherein whether rotation is performed or not is determined in accordance with the receiving capability of the receiving apparatus and also on the document setting position. If the rotation is required, the reading operation is performed in such a manner that the line density in the secondary scanning direction in the reading operation will become the line density in the principal direction after the rotation so that no degradation in the resolution and processing efficiency occurs.

15 Claims, 10 Drawing Sheets

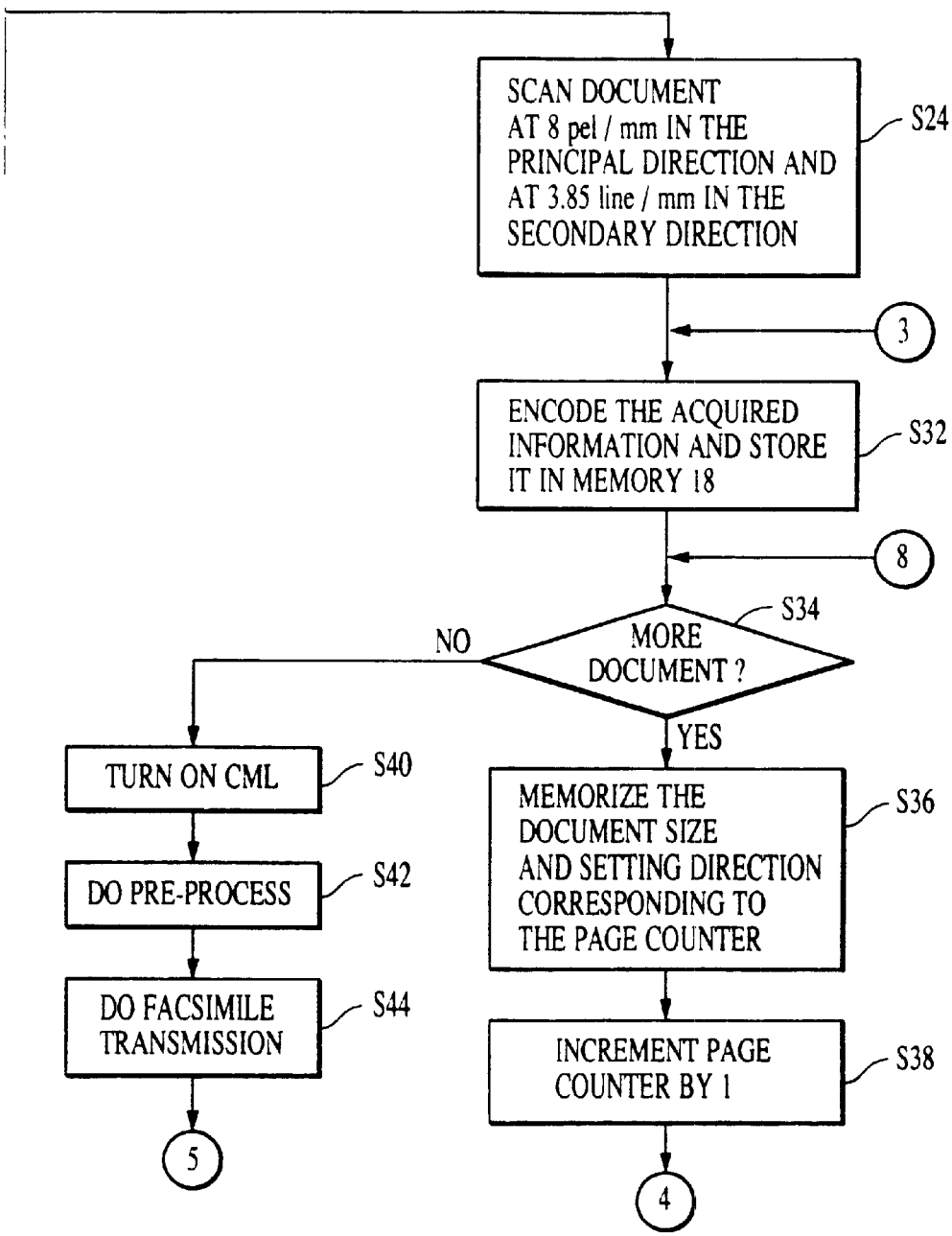

IMAGE DATA TRANSMISSION APPARATUS

This application is a division of Application Ser. No. 08/544,066, filed Oct. 17, 1995, U.S. Pat. No. 6,005,672.

BACKGROUND OF THE INVENTION

1. Field of the Invention

The present invention relates to an image data transmission apparatus for transmitting image data, and more particularly, to an image data transmission apparatus that reads a document placed on the apparatus and transmits the image data of the document with a desired line density (resolution).

2. Description of the Related Art

Facsimile equipment is now widely used as an image data transmission apparatus for reading a given document and transmitting the image data of the document. Such facsimile equipment can transmit image data with various line densities such as those given in normal mode (8 pel/mm×3.85 line/mm), fine mode (8 pel/mm×7.7 line/mm), super fine mode (8 pel/mm×15.4 line/mm), and ultra fine mode (16 pel/mm×15.4 line/mm) wherein the line density in the principal scanning direction can be set to 8 pel/mm or 16 pel/mm, and the line density in the secondary scanning direction can be set to 3.85 line/mm, 7.7 line/mm or 15.4 line/mm.

Some known facsimile apparatuses have the capability of reading image data from a document of A3 size (297 mm×420 mm) in such a manner that the principal scanning is performed in a direction along the shorter sides of the document. In this case, when a A3-size document is placed on facsimile equipment, the principal scanning is normally performed along the shorter sides of the document and the line density in the principal scanning direction is set to 8 pel/mm or 16 pel/mm, whereas the secondary scanning is performed along the longer sides with the line density of 3.85 line/mm, 7.7 line/mm or 15.4 line/mm. The image data acquired by the above scanning operation is then transmitted. However, if an A4-size (210 mm×297 mm) document is placed on the facsimile apparatus in such a manner that the principal scanning is performed along the longer sides of the document (hereafter such a document position will be referred to as a "horizontal position", and 90°-rotated document position will be referred to as a "vertical position"), the line density in the principal scanning direction along the longer sides becomes equal to the line density which is obtained in the secondary scanning direction for an A3-size document, and the line density in the secondary scanning direction for the A4-size document becomes equal to the line density in the principal scanning direction for the A3-size document. In this case, the image data obtained in the scanning operation is transmitted after rotating the image data by an amount of 90° so that the transmitted image becomes similar to that obtained when the A4-size document is placed on the facsimile equipment in such a manner that the principal scanning is performed along the shorter sides.

However, in the above-described conventional facsimile equipment, when an A4-size document is placed in the horizontal position on the facsimile equipment so that the principal scanning is performed along the longer sides, the image data is transmitted after rotating the image by 90° regardless of the capability of a facsimile apparatus at a receiving end. This means that the image is rotated by 90° before transmission even if the receiving facsimile apparatus has the capability of printing received image data on A3-size paper or the capability of printing image data on A4-size paper in such a manner that the principal printing is performed along the longer sides of the A4-size paper. An image of a horizontally-positioned A4-size document is always converted into a vertical-position image, although a high speed receiving and printing operation will be achieved if a sending apparatus transmits a horizontal-position image without rotation and a receiving apparatus prints the received image on horizontally-positioned paper.

SUMMARY OF THE INVENTION

It is a general object of the present invention to solve the above problems. More specifically, it is an object of the present invention to provide an image data transmission apparatus having the capability of transmitting image data in a mode best-matched to the capability of a receiving apparatus.

It is another object of the present invention to provide a technique for avoiding a reduction in processing efficiency and degradation in picture quality which would otherwise occur owing to resolution conversion.

It is still another object of the present invention to provide an image data transmission apparatus having the capability of transmitting image data after performing a proper process depending on the document size and the document setting orientation.

The foregoing and other objects and features of the invention will become apparent from the following description of embodiments with reference to the accompanying drawings.

DESCRIPTION OF THE PREFERRED EMBODIMENTS

Referring to the accompanying drawings, preferred embodiments of the present invention will be described below.

Figure 1:
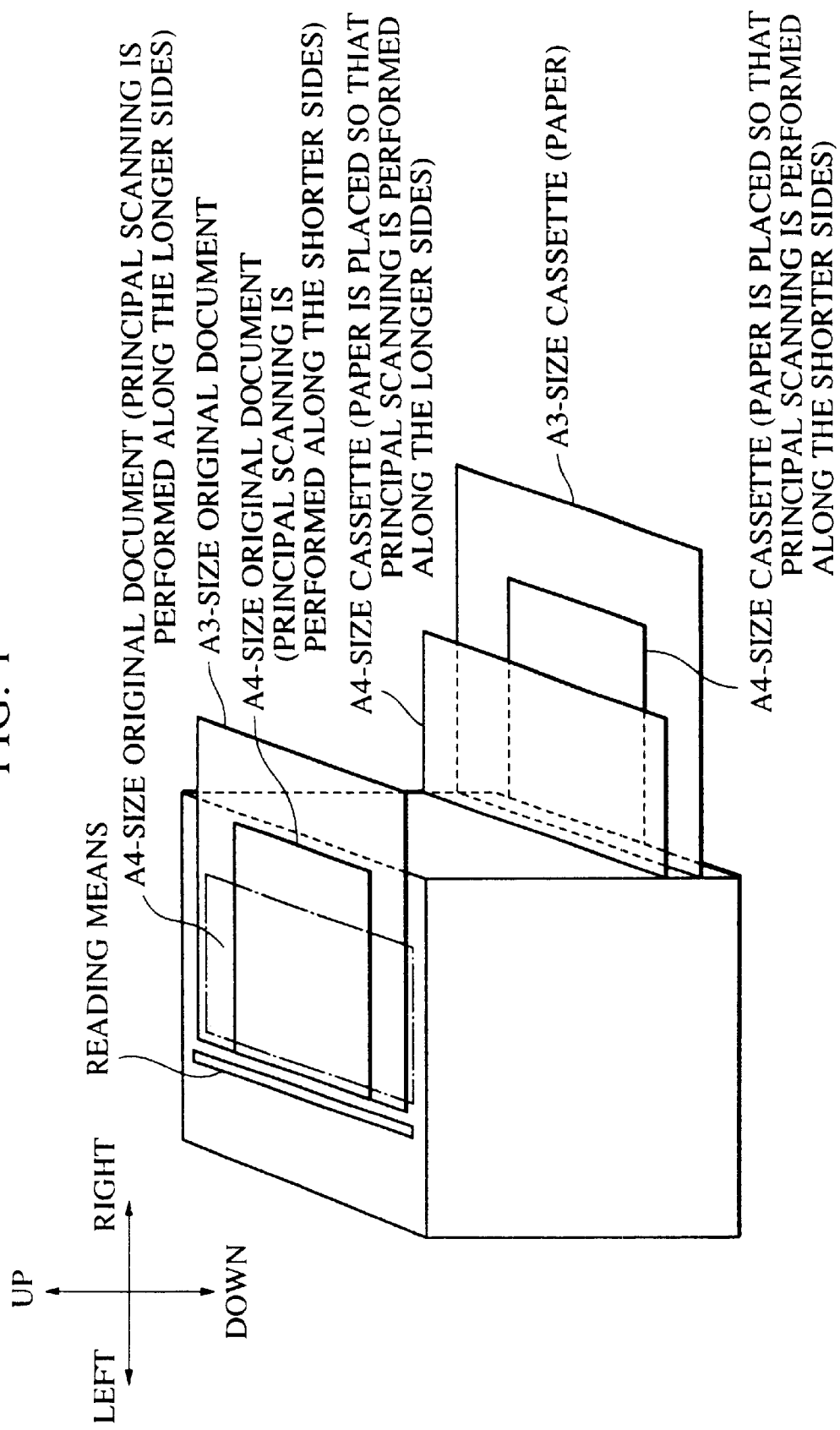
FIG. 1 is a perspective view illustrating a manner of placing an original document and printing paper on a facsimile apparatus according to an embodiment of the present invention.

FIG. 1 is a perspective view illustrating a manner of placing an original document and printing paper on a facsimile apparatus according to an embodiment of the present invention.

As shown in FIG. 1, in the facsimile apparatus according to the present embodiment, the reading width of a reading unit and the printing width of a printing unit are set to 297 mm which is equal to the length of a longer side of A4-size paper. A4-size document and printing paper are placed on a document tray or printing paper tray so that the document and printing paper are transferred in either direction along longer or shorter sides. In the case of A3-size document and printing paper, on the other hand, the document and printing paper are placed so that they are transferred in the direction along their longer sides.

Figure 2:
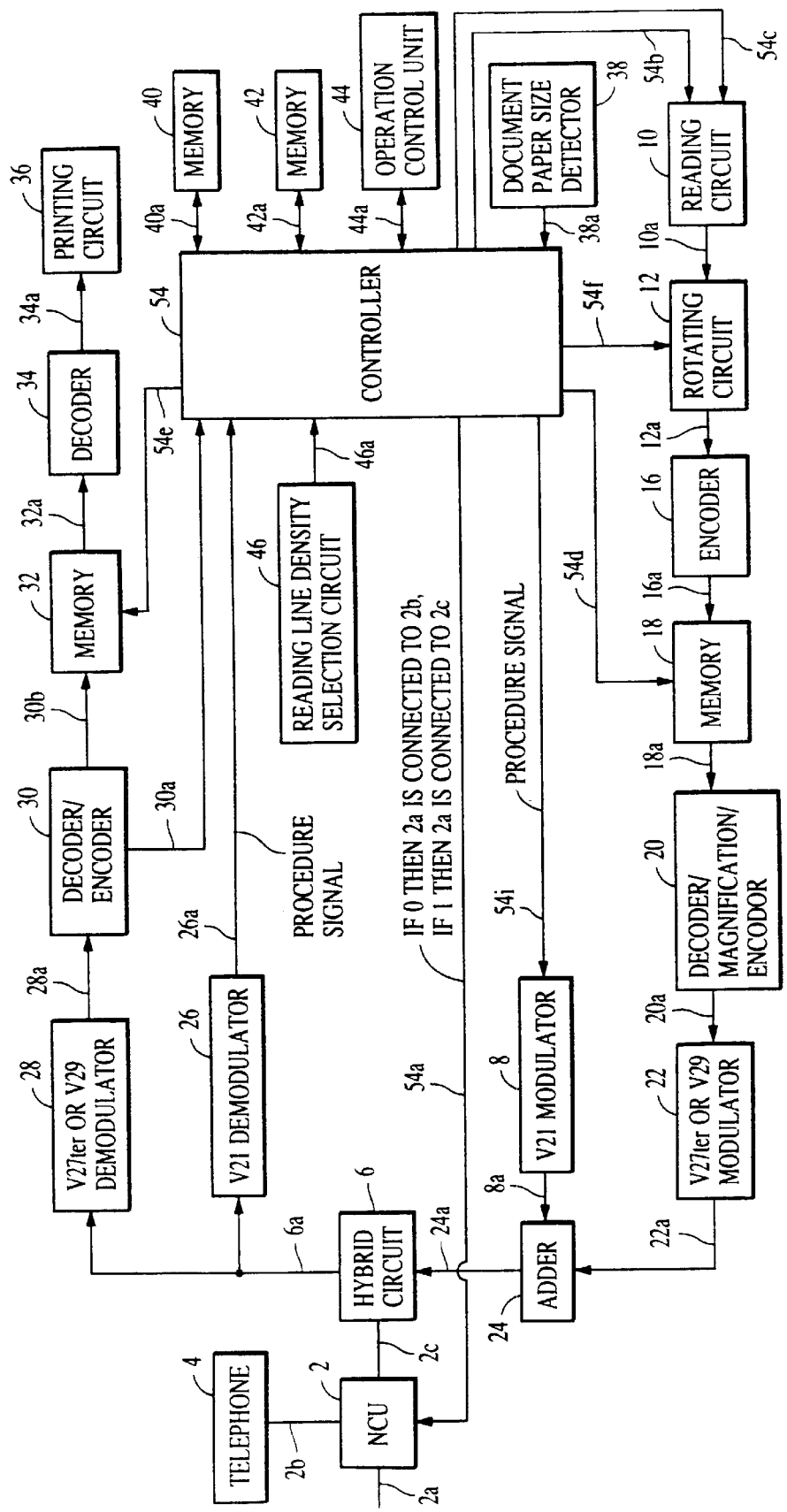
FIG. 2 is a block diagram of an embodiment of a facsimile apparatus according to the present invention.

FIG. 2 is a block diagram of a facsimile apparatus according to the present embodiment of the invention.

An NCU (network control unit) 2 is connected to a terminal of a telephone line so that the NCU 2 controls various operations required for data communication via a telephone network. That is, the NCU 2 controls the connection of a telephone network, switching of data communication lines, and holding of a loop. If the NCU 2 receives a "0"-level signal (via a signal line 54*a*) from a controller 54, the NCU 2 connects a telephone line 2*a* to a telephone 4. On the other hand, if the NCU 2 receives a "1"-level signal from the controller 54, the NCU 2 connects the telephone line 2*a* to a facsimile apparatus. In a normal state, the telephone line 2*a* is connected to the telephone 4.

A hybrid circuit 6 separates a transmitting signal and a receiving signal from each other. The hybrid circuit 6 transfers a transmitting signal received from an adder 24 to the telephone line 2*a* which has been received via the NCU 2. The hybrid circuit 6 also transfers a signal received from a sending apparatus via the NCU 2 to a V29 demodulator 28 and a V21 demodulator 26 via a signal line 6*a*.

A V21 modulator 8 performs modulation according to the standard known as the ITU-T recommendation V21. More specifically, the V21 modulator 8 performs modulation on a procedure signal received from the controller 54 (via a signal line 54*i*) and transmits the modulated signal to the adder 24 via a signal line 8*a*.

A reading circuit 10 is composed of an optical system and a line sensor such as a CCD (charge coupled device) acting as an image sensing device. The reading circuit 10 reads an image signal from a document to be transmitted in the principal scanning direction line by line, and generates a series of two-level signals each representing either white or black, and the series of signals is output over a signal line 10*a*. The reading circuit 10 can read an image from a document having a width up to 297 mm. Therefore, as shown in FIG. 1, in the case of an A4-size document, the principal scanning can be performed in either direction along the shorter or longer sides of the document, whereas in the case of an A3-size document, the principal scanning is performed in the direction along the shorter sides.

In response to a signal given by a line density selection circuit 46, the controller transmits a signal to the reading circuit 10 via a signal line 54*b* to tell the line density (x pel/mm) in the primary direction and also transmits a signal to the reading circuit 10 via a signal line 54*c* to tell the line density (y line/mm) in the secondary direction wherein x and y may have a value selected from the group including 3.85, 7.7, 15.4, 8, 16.

A rotating circuit 12 rotates image data received via the signal line 10*a* by an amount of 90°, and then outputs the resultant image data over a signal line 12*a*. When the rotating circuit 12 receives a "0"-level signal from the controller 54 via a signal line 54*f*, the rotating circuit 12 outputs the image data directly to the signal line 12*a* without performing rotation. On the other hand, if the rotating circuit 12 receives a "1"-level signal from the controller 54 via the signal line 54*f*, the rotating circuit 12 outputs the image data to the signal line 12*a* after performing rotation. If the image data has a line density of $a_k$ pel/mm in the principal scanning direction and a line density of $b_k$ line/mm in the secondary direction before rotation, the line densities in the principal and secondary directions will become $b_k$ pel/mm and $a_k$ line/mm, respectively, after rotation.

An encoder 16 receives information via the signal line 12*a* and encodes the received information (by means of MR-encoding with K=8). The coded data is output over a signal line 16*a*.

Under the control of a control signal given via a signal line 54*d*, a memory 18 stores the coded data received from the signal line 16*a*, and also outputs the coded data stored in the memory over a signal line 18*a*.

A decoder/magnification/encoder 20 receives a signal via the signal line 18*a* and, if required, decodes the received signal and encodes the signal again after magnifying the decoded signal. The resultant data is output over a signal line 20*a*.

A modulator 22 performs modulation according to the known standard ITU-T recommendation V27ter (differential phase modulation) or V29 (quadrature modulation). More specifically, the modulator 22 modulates a signal received via the signal line 20*a*, and outputs the modulated signal over a signal line 22*a*.

The adder 24 adds signals received via the signal lines 8*a* and 22*a* and outputs the result over a signal line 24*a*.

The demodulator 26 performs demodulation according to the standard known as the ITU-T recommendation V21. That is, the demodulator 26 modulates a signal received via the signal line 6*a* and outputs the demodulated data over a signal line 26*a*.

The demodulator 28 performs demodulation according to the standard known as the ITU-T recommendation V27ter (differential phase modulation) or V29 (quadrature modulation). That is, the demodulator 28 demodulates a signal received via the signal line 6*a* and outputs the demodulated data over a signal line 28*a*.

A decoder/encoder 30 receives the demodulated data via the signal line 28*a* and decodes the received data. The decoded data is output over a signal line 30*a*. Furthermore, the decoder/encoder 30 encodes the decoded data again into MR-coded data with K=8 and outputs the result over a signal line 30*b*.

Under the control of a control signal given via a signal line 54*e*, a memory 32 stores the coded data received via the signal line 30*b*. The memory 32 also outputs the data stored therein over a signal line 32*a* under the control of the control signal given via the signal line 54*e*.

A decoder 34 performs MR-decoding (with K=8) on a signal received via the signal line 32*a* and outputs the decoded data over a signal line 34*a*.

A printing circuit 36 includes an LBP (laser beam printer). It receives the data over the signal line 34*a*, and prints the received data line by line at a constant speed.

A detector 38 detects the size of a document placed on a document tray and also detect the document setting position. If the detector 38 detects that a A4-size document is placed in such a manner that the principal scanning is performed in a direction along the longer sides (hereafter such a document position will be referred to as an A4-horizontal-position), then the detector 38 outputs a signal "0" over a signal line 38*a*. On the other hand, if the detector 38 detects that an A4-size document is placed in such a manner that the principal scanning is performed in a direction along the shorter sides (hereafter such a document position will be referred to as an A4-vertical-position), the detector 38 outputs a signal "1" over the signal line 38*a*. Furthermore, when an A3-size document is placed, the detector 38 outputs a signal "2" over the signal line 38*a*.

A memory 40 registers, via a signal line 40*a*, the line density in the principal scanning direction which can be accepted by each destination apparatus wherein the registration is performed for each destination in relation to its one-stroke dialing or short dialing number. More specifically, the memory 40 can register the information about line density for 25 different one-stroke dialing numbers and 100 different short dialing numbers wherein the memory 40 registers the information representing whether the receiving apparatus at each destination has the capability accepting a line density of 8 pel/mm or 16 pel/mm in such a manner that "0" is stored in the memory 40 when a receiving apparatus can accept both 8 and 16 pel/mm and "1" is stored when the receiving apparatus can accept only 8 pel/mm. "0" is stored in the memory as an initial value.

A memory 42 registers, via a signal line 42a, the information representing whether each destination apparatus has the capability of receiving and printing horizontally-positioned A4-size image data, that is, whether the destination apparatus has the capability of printing the received A4-size image data on A4-size paper in such a manner that the principal scanning direction is performed along the longer sides of the A4-size paper wherein the registration is performed for each destination in relation to its one-stroke dialing or short dialing number. In the above registration, as in the case of the memory 40, "1" is stored in the memory 42 when a destination apparatus can accept horizontally-positioned A4-size image data in the above-described sense, and "0" is stored when the destination apparatus has no such capability. "0" is stored in the memory 42 as an initial value.

An operation control unit 44 includes various keys such as one-stroke dialing keys, short dialing keys, a start key, a ten-key, and keys for other functions. If a particular key is pressed, corresponding information is output over a signal line 44a.

The line density during a reading operation is selected by the line density selection circuit 46. When a normal mode is selected via the operation control unit 44, the line density selection circuit 46 outputs a signal "0" over a signal line 46a. Similarly, when the operation mode is selected to a fine mode, super fine mode, or a ultra fine mode, the line density selection circuit 46 outputs signals, "1", "2", or "3", respectively, corresponding to the selected mode over the signal line 46a. The line densities in these modes are (8, 3.85), (8, 7.7), (8, 15.4), (16, 15.4) where (x, y) denotes (line density in the principal scanning direction, line density in the secondary scanning direction).

The controller 54 is responsible for control of the entire apparatus. The controller 54 determines the line densities in the principal and secondary scanning directions of transmission data, and also determines whether the rotating circuit should perform rotation on the data, taking into account various conditions such as the size of a document placed on the apparatus, the document setting position, and the contents registered in individual memories.

Figure 3:
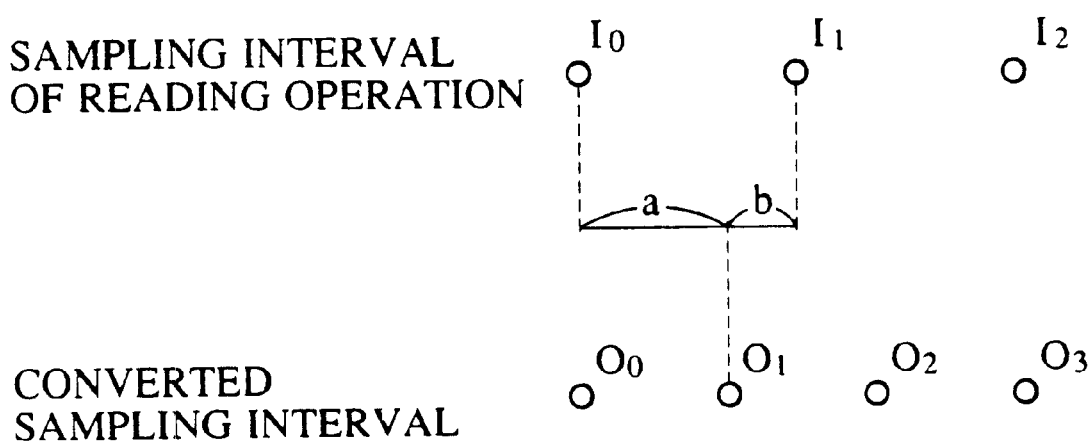
FIG. 3 is a schematic representation of line density conversion in the principal scanning direction.

Now, referring to FIG. 3, the line density conversion performed by the reading circuit 10 will be described below.

The line density in the principal scanning direction is performed by means of linear interpolation. The sampling pitch during a reading operation in the principal scanning direction is set to a fixed value of 8 pel/mm or 16 pel/mm. Image data with a desired line density can be obtained by performing conversion taking into account the sampling pitch of the reading operation and the sampling pitch and the pixel levels after conversion. That is, as shown in FIG. 3, multi-level data $I_n$ (n=0, 1, 2, . . . ) acquired via the reading operation is converted into multi-level data $O_n$ (n=0, 1, 2, . . . ) on a desired sampling pitch. For example, multi-level data O after conversion can be obtained using the following equation:

$$O=(b \cdot I_0 + a \cdot I_1)/(a+b).$$

All data is calculated in a similar manner.

On the other hand, the line density in the secondary scanning direction can be set to a desired value by controlling a reading motor (not shown) disposed in the reading circuit 10 so that it operates asynchronously to the reading timing and so that the reading is performed at desired intervals. Thus, the reading operation is performed with a desired line density without having degradation in the picture quality, which would occur in the case where the line density conversion is performed by means of image processing. The reading motor may be a DC motor or a micro-step controlled motor.

Referring to FIGS. 4 to 7, the operation performed under the control of the controller 54 will be described below.

In the example described below, it is assumed that the facsimile apparatus has the capability of transmitting both A4-size and A3-size documents.

Figure 4:
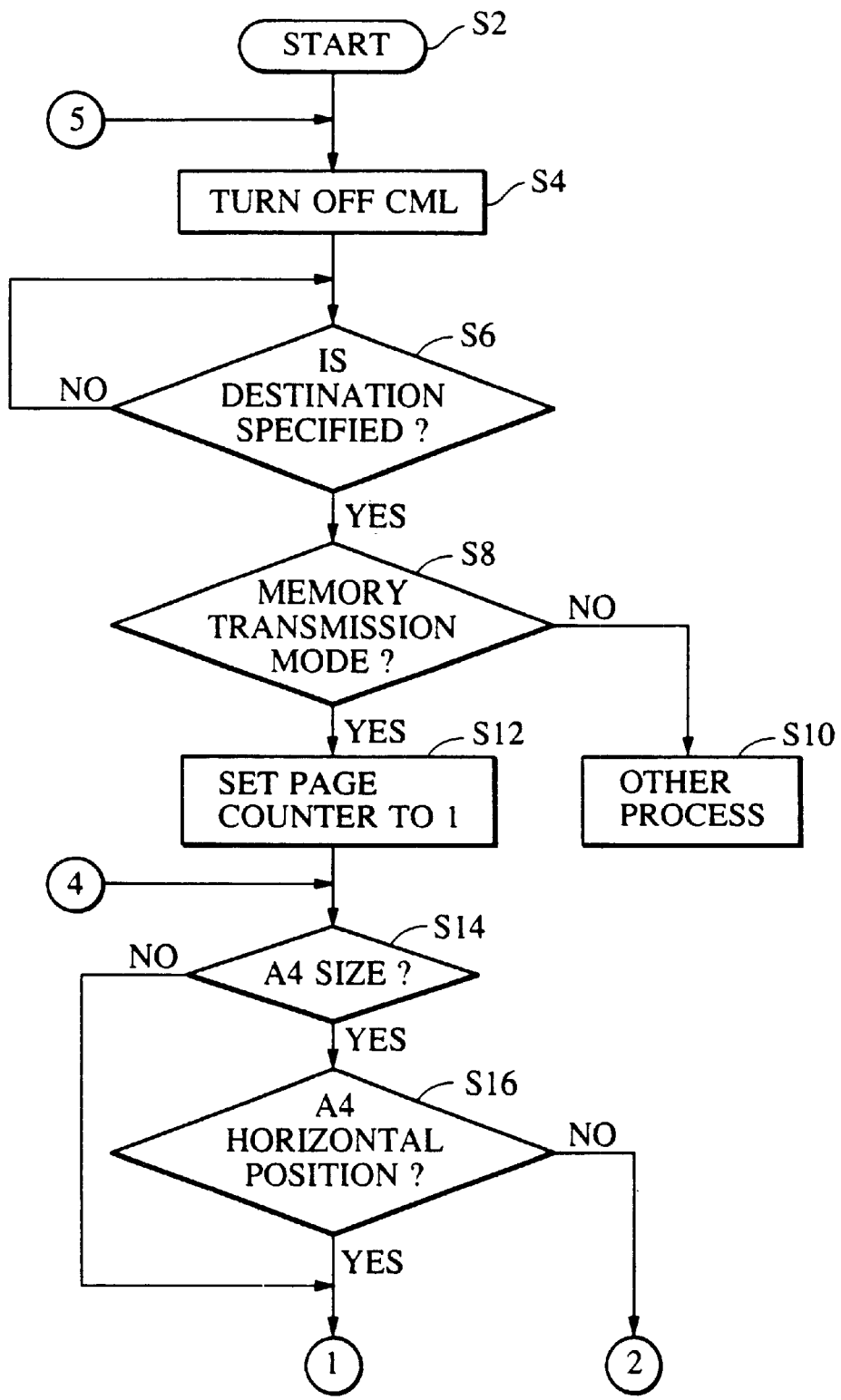
FIGS. 4 to 9 are flow charts illustrating the operation of the facsimile apparatus.
Figure 5A:
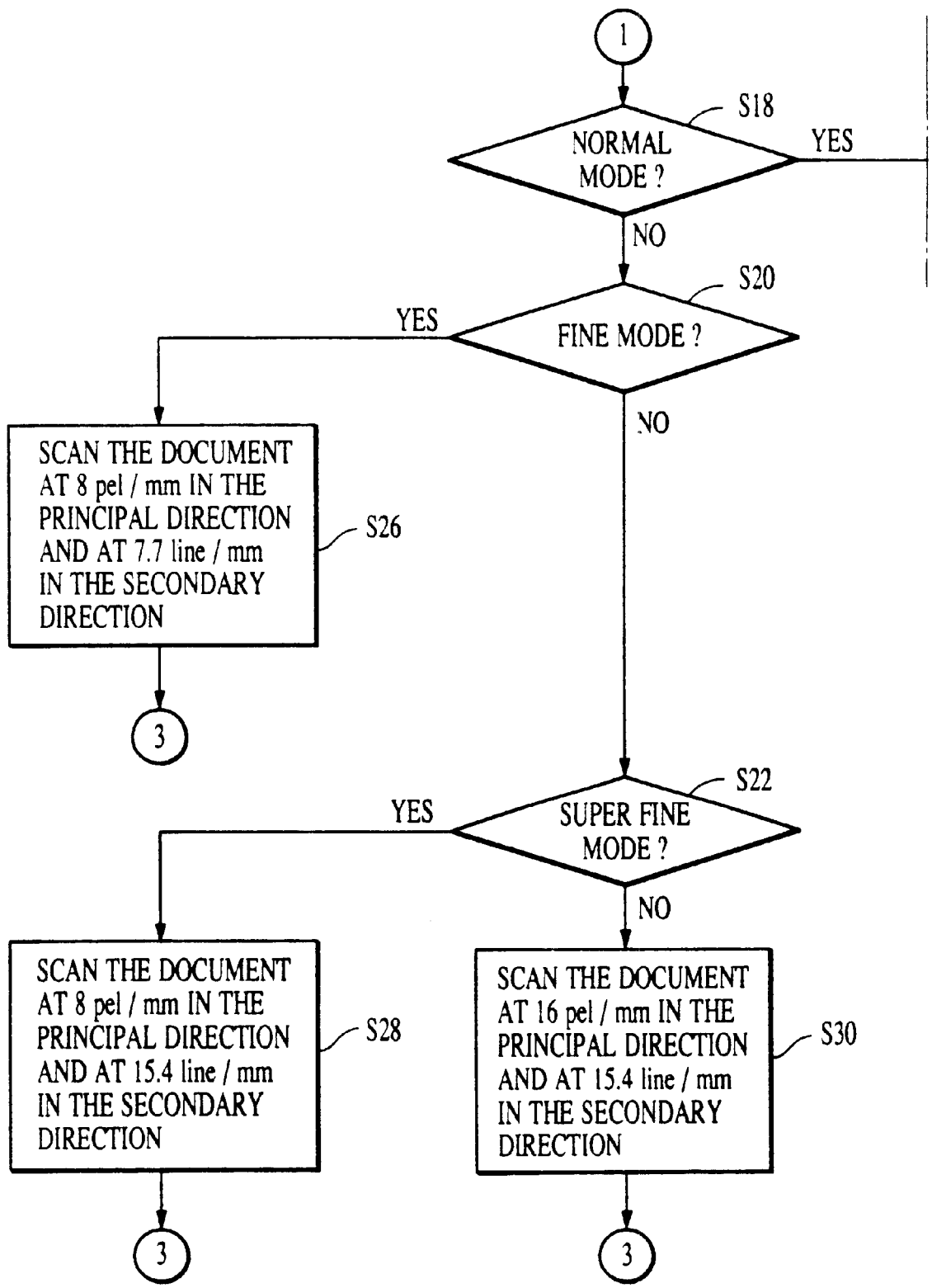
Figure 6:
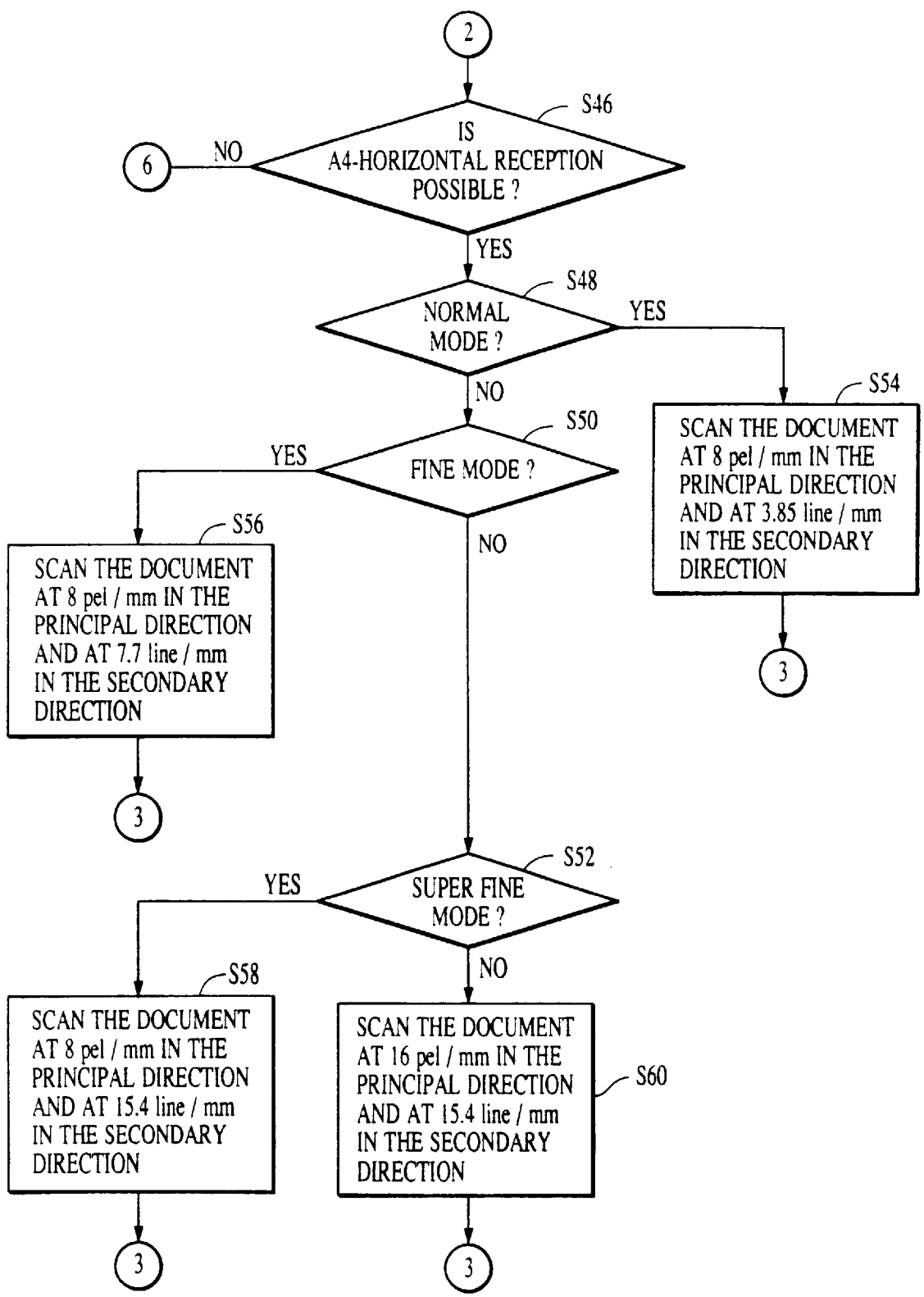
Figure 7:
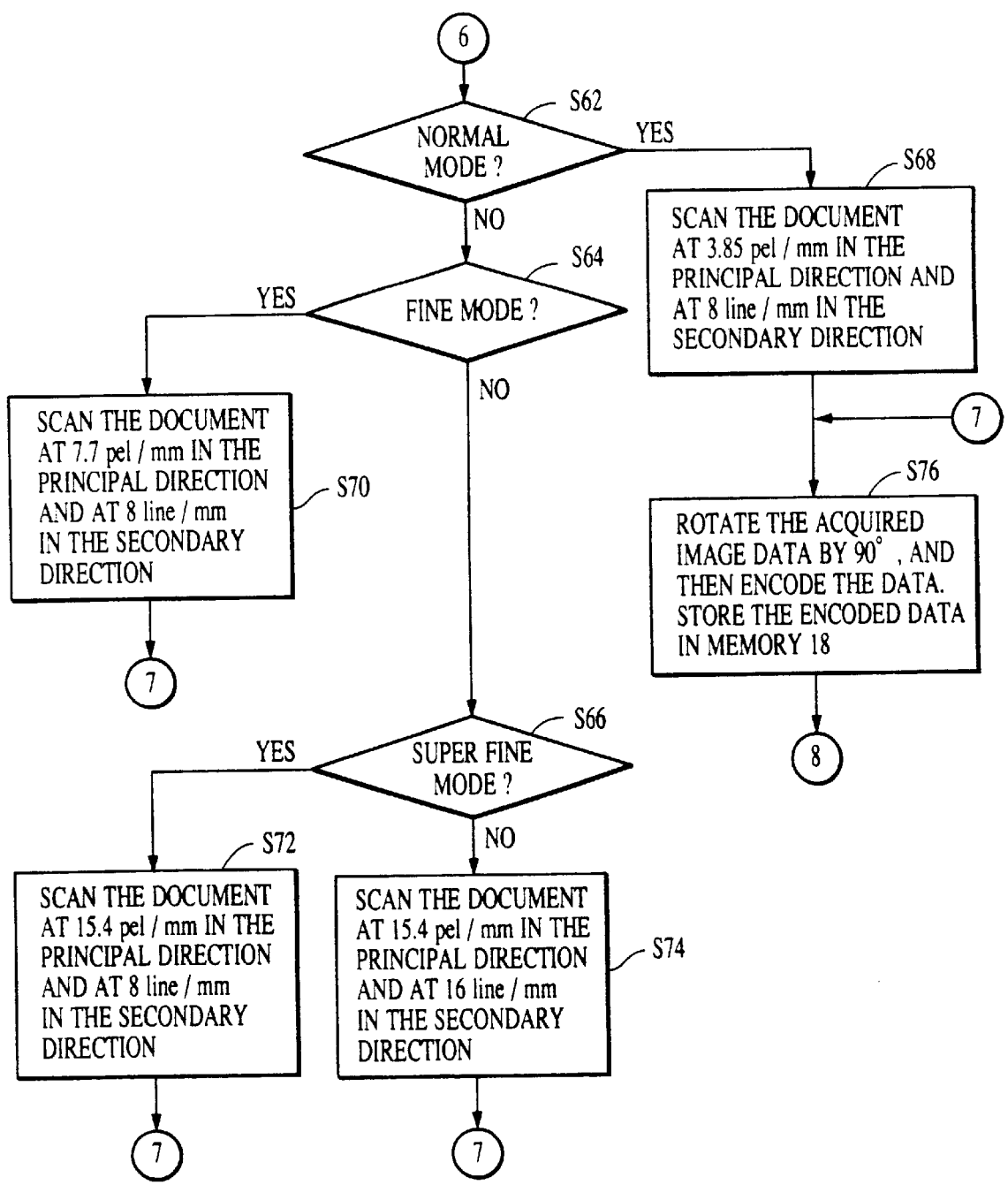

In FIG. 4, the process begins at step S2. In step S4, a "0"-level signal is output over the signal line 54a thereby turning off the CML. Then in step S6, it is checked whether a destination of document data has been input. The destination is specified by inputting a destination number via the ten-key or the one-stroke key, or otherwise by means of short dialing. Before inputting the destination, a document is placed on the document tray, and the operation mode is set to one of the modes: normal, fine, super fine, and ultra fine. Then, in step S8, it is determined whether the transmission is to be performed in the memory transmission mode. If no, then the process goes to step S10 so as to perform other operations. If yes, then the process goes to step S12 at which the page counter is set to 1. In step S14, it is determined whether the size of the document placed on the document tray is A4. If the document size is A4, then the process goes to step S16 whereas the process goes to step S18 if the document size is A3. In step S16, it is determined in which direction the document is placed. If it is detected that the document is placed in the vertical position, that is, the document is placed so that the principal scanning is performed along the shorter sides of the document, then the process goes to step S18. On the other hand, if the document is placed in the horizontal position, the process goes to step S46.

In steps S18, S20, and S22, the line density selected via the operation control unit 44 is detected from the information received via the signal line 46a, and the information representing the line density is output to the reading circuit 10 via the signal lines 54b and 54c. Thus, in the case where the operation mode is set to the normal mode, then the reading operation in step S24 is performed by scanning the document with a line density of 8 pel/mm in the principal direction and 3.85 line/mm in the secondary direction. In the case of the fine mode, the reading operation is performed in step S26 in such a manner that the document is scanned with a line density of 8 pel/mm in the principal direction and 7.7 line/mm in the secondary direction. In the case of the super fine mode, the reading operation is performed in step S28 in such a manner that the document is scanned with a line density of 8 pel/mm in the principal direction and 15.4 line/mm in the secondary direction. In the case of the ultra fine mode, the reading operation is performed in step S30 in such a manner that the document is scanned with a line density of 16 pel/mm in the principal direction and 15.4 line/mm in the secondary direction. Then in step S32, the document data which has been obtained in the above-described manner is encoded by the encoder 16 without being rotated by the rotating circuit 12 (in the case where the signal line 54f is at a "0"-level), and the resultant data is stored in the memory 18. In step S34, it is checked whether there is another document waiting for transmission, and if yes then the process goes to step S36 whereas the process goes to step S40 if there is no document (or if another document has not been placed in a predetermined time period). In step S36, the document size and the document setting position are stored in relation to the page counter. More specifically, the information representing one of the document setting positions, A4-vertical, A4-horizontal, and A3-vertical positions is stored. In step S38, the page counter is incremented by one.

In step S40, a "1"-level signal is output over the signal line 54a thereby turning on the CML. Then the process goes to step S42 in which pre-processing for facsimile transmission is performed. That is, the coded data stored in the memory 18 is decoded, magnified, and encoded again as required, and the resultant data is facsimile-transmitted in step S44.

In step S46, it is checked whether the apparatus at the destination designated in step S6 has the capability of receiving data in the A4-horizontal position by referring to the information stored in the memory 42. If no information is stored in the memory 42, it is assumed that the apparatus at the destination does not have such a capability. If it is concluded in step S46 that the destination apparatus has the capability of receiving data in the A4-horizontal position, then the process goes to step S48 whereas the process goes to step S62 in the other case. In steps S48, S50, and S52, the line density selected via the operation control unit 44 is detected in a similar manner to steps S18, S20, S22 described above, although these steps will not be described further here.

Also in steps S62, S64, and S66, the line density selected via the operation control unit 44 is detected. However, in the case where it has been concluded in step S46 that the destination apparatus does not have the capability of receiving data in the A4-horizontal position, the data is rotated by the rotating circuit 12. Thus, if the operation mode is set to the normal mode, then the reading operation in step S68 is performed by scanning the document with a line density of 3.85 pel/mm in the principal direction and 8 line/mm in the secondary direction. In the case of the fine mode, the reading operation is performed in step S70 in such a manner that the document is scanned with a line density of 7.7 pel/mm in the principal direction and 8 line/mm in the secondary direction. In the case of the super fine mode, the reading operation is performed in step S72 in such a manner that the document is scanned with a line density of 15.4 pel/mm in the principal direction and 8 line/mm in the secondary direction. In the case of the ultra fine mode, the reading operation is performed in such a manner that the document is scanned with a line density of 15.4 pel/mm in the principal direction and 16 line/mm in the secondary direction. In the reading operation in these modes, the line density conversion in the principal scanning direction is achieved by means of the linear interpolation and the line density setting in the secondary direction is achieved by controlling the operation of the reading motor as described above. Then in step S76, the multi-level image data obtained in the above-described manner is rotated by the rotating circuit by an amount of 90° (in the case where the signal line 54f is at a "1"-level). The rotated data is then encoded by the encoder 16 and stored in the memory 18. In this way, all document data is transmitted.

In this embodiment, as described above, a sending facsimile apparatus transmits data in a mode best-matched to the capability of a receiving facsimile apparatus so that the receiving facsimile apparatus can receive and print data in the best mode without imposing an additional load. Furthermore, since the capability of the receiving facsimile apparatus is checked in advance, the probability of performing image processing after storing data in the memory is reduced and it is possible to prevent the degradation in the picture quality. Before generating transmission data, the line densities are set to optimum values depending on the capability of the receiving facsimile apparatus and it is also determined whether or not the data should be rotated depending on the capability of the receiving facsimile apparatus. This allows the process to be performed effectively.

In the embodiment described above, it is assumed that the transmission is performed in the memory transmission mode. Transmission in a direct transmission mode can also be performed in the same manner as the memory transmission mode except that the line densities are set to those values which will be employed when the capability of the receiving facsimile apparatus is not registered in the memory 42 in the memory transmission mode described above. Alternatively, the capability of the receiving facsimile apparatus may be detected during pre-processing so that the transmission can be performed in the same manner as in the memory transmission mode.

In the embodiment described above, it is also assumed that the facsimile apparatus can transmit a document of A3-size and A4-size. However, the invention is not limited only to those document sizes, and the invention may also be applied to other sizes so that the document size and the document setting position may be detected.

When the memory 42 indicates that the receiving facsimile apparatus has the capability of receiving A3-size (vertical position) data, if a document is placed in the A4-horizontal position, the reading operation may be performed in such a manner that the line density in the direction along the longer sides is 8 pel/mm or 16 pel/mm and the line density in the direction along the shorter sides is 3.85 line/mm, 7.7 line/mm, or 15.4 line/mm. Alternatively, the data may also be transmitted after combining two A4-size documents into one image equivalent to one A3-size document. In this case, the data is transmitted so that the receiving facsimile apparatus can receive the data on A3-size printing paper with line densities of 8 pel/mm or 16 pel/mm in the direction along the shorter sides and 3.85 line /mm, 7.7 line/mm, or 15.4 line/mm in the direction along the longer sides.

Figure 8:
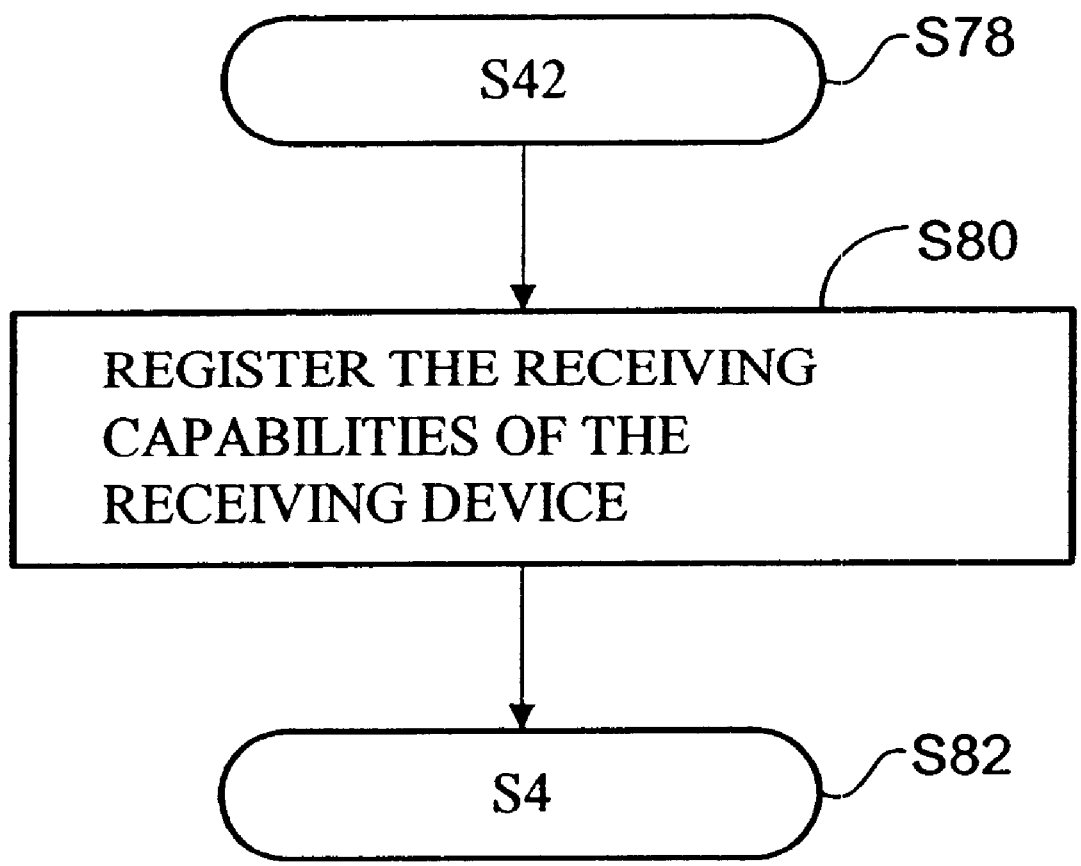

If the memory 42 includes no information about the receiving capability of a destination corresponding to a one-stroke number or a short-dialing number, the capability may be detected and registered in the memory 42 after performing transmission once. FIG. 8 is a flow chart illustrating the part of the process which is different from that in the embodiment described above. Step S78 is the same as step S42 in FIG. 5. In step S80, the receiving capability, that is, the document size and the document setting position available in a receiving facsimile apparatus, is detected during the pre-processing before the facsimile transmission, and the information about the receiving capability is registered in the memory 42. Then the facsimile transmission is performed. Afterward, the process goes to step S82 that is the same as step S4 in FIG. 4. Thus, once data is transmitted to a certain destination, the receiving capability of that destination apparatus can be registered. With this technique, it is also possible to re-register the capability of a receiving apparatus in the memory 42 when the receiving facsimile apparatus has been changed to a new type. The registration of the receiving capability may also be performed by an operator.

Figure 9:
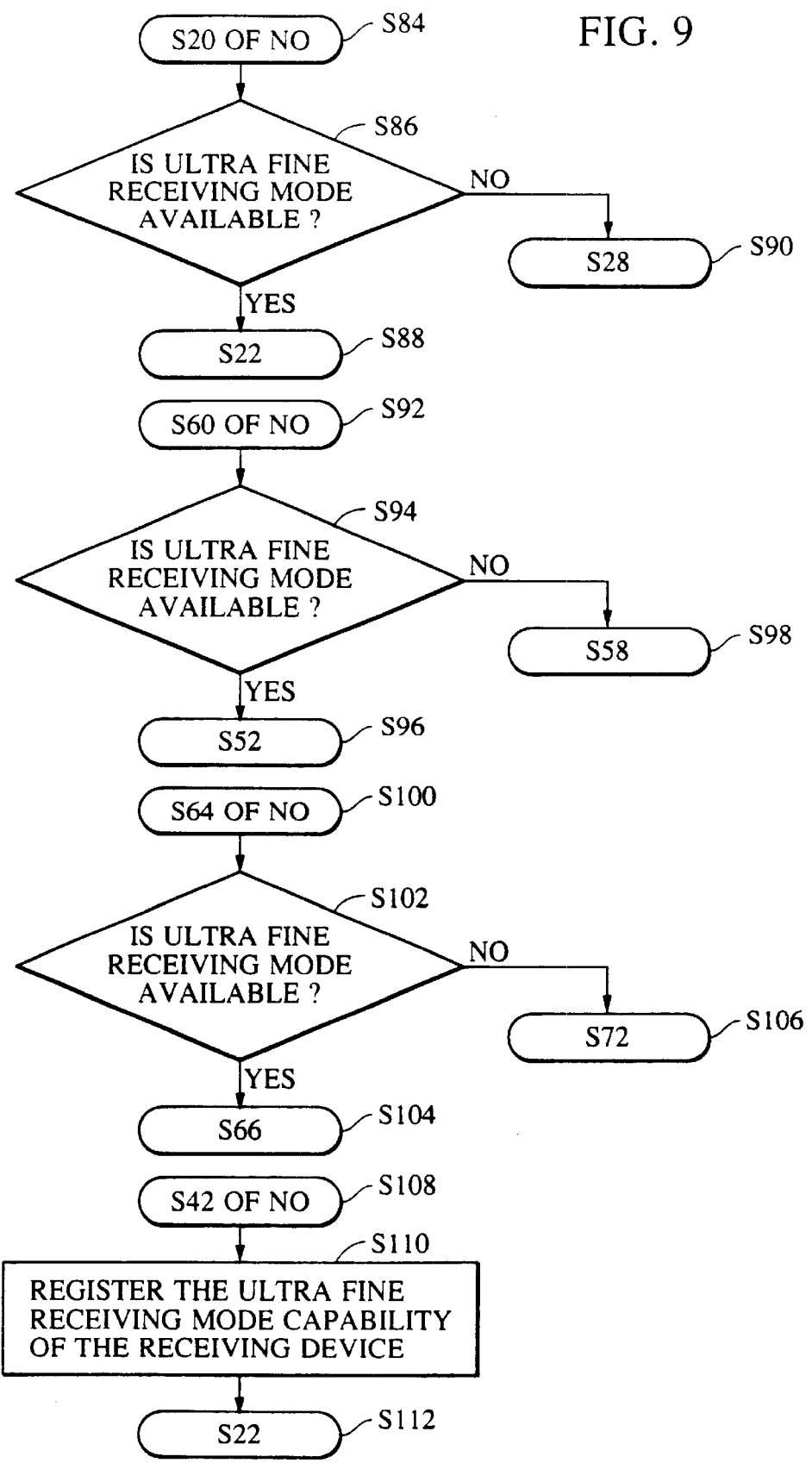

The embodiment described above may be modified such that the contents stored in the memory 40 are checked and the process is performed according to the contents so that transmission may be performed in a more effective manner. FIG. 9 is a flow chart illustrating the part of the process different from that of the previous embodiment. Step S84 is the same as step S20 in FIG. 5. In step S86, the contents of the memory 40 are checked so as to determine whether a destination apparatus has the capability of receiving document data in the ultra fine mode. If yes, then the process goes to step S88 (step S22 in FIG. 5). On the other hand, if it turns out that the destination apparatus has no such capability the process goes to step S90 (step S28 in FIG. 5) at which the operation mode is set to the super fine mode. Steps S92 to S106 are performed in a similar manner and therefore these steps are not described further here. The ultra fine mode capability of a receiving apparatus may also be detected and registered by performing facsimile transmission once as described earlier. In this case, in step S108 (step S42 in FIG. 5) pre-processing for facsimile transmission is performed. The information representing whether the receiving apparatus has the capability of receiving data in the 16-pel/mm line density mode is obtained during the pre-processing, and this information is stored in the memory 40 in step S110. Then the facsimile transmission is performed. Afterward, the process goes to step S82 that is the same as step S4 in FIG. 4. The above information may also be registered by an operator. In this embodiment, when data is transmitted to a destination having no capability of receiving data in the ultra fine mode, the data is transmitted in the super fine mode even if ultra-fine-mode transmission is selected in a sending apparatus. In this embodiment, when transmission is performed in the memory transmission mode, it is possible to prevent the memory 18 from storing data which has been unnecessarily generated in the ultra fine mode when the receiving apparatus does not have capability of ultra fine mode. Furthermore, in this embodiment, it is also possible to prevent degradation in the picture quality which would otherwise occur when coded data is converted into data having a coarser line density.

In this embodiment, as described above, transmission can be performed in a manner which is more effective and is better matched to the capability of a receiving apparatus.

According to the present invention, as described above, it is possible to transmit image data in a mode which is best-matched to the capability of a receiving apparatus.

While the present invention has been described with reference to specific preferred embodiments, the description is illustrative of the invention and is not to be construed as limiting the invention, and it should be understood that various changes, substitutions and alterations can be made herein without departing from the spirit and scope of the invention as defined by the appended claims.

What is claimed is:

1. An image communication apparatus, comprising:
   an input means for inputting image data;
   a memory means for storing a receiving capability of at least one receiver side;
   a determination means for determining the receiving capability of each receiver side using said memory means;
   a processing means for rotating and converting the image data input by said input means in accordance with a determination result by said determination means; and
   a transmission means for transmitting the image data processed by said processing means to the receiver side.

2. An image communication apparatus according to claim 1, wherein said processing means comprises rotation means for rotating the image data input by said input means and conversion means for converting the image data rotated by said rotation means in accordance with the determination result by said determination means.

3. An image communication apparatus according to claim 2, wherein said conversion means converts a resolution of the image data rotated by said rotation means.

4. An image communication apparatus according to claim 3, further comprising a designation means for designating a resolution of the image data to be transmitted by said transmission means, wherein said conversion means converts the resolution of the image data rotated by said rotation means when said determination means determines that the receiving side can not receive the image data of which a resolution has been designated by said designation means.

5. An image communication apparatus according to claim 4, further comprising a plurality of selecting means for selecting a destination for transmitting the image data by said transmission means,
   wherein said selecting means stores the receiving capability obtained by communicating with the destination selected by said selecting means corresponding to the destination.

6. An image communication method comprising:
   an input step, of inputting image data;
   a storing step, of storing a receiving capability of at least one receiver side;
   a determination step, of determining the receiving capability of each receiver side using the stored receiving capability of the at least one receiver side;
   a processing step, of rotating and converting the image data input by said input step in accordance with a determination result by said determination step; and
   a transmission step, of transmitting the image data processed by said processing step to the receiver side.

7. An image communication method according to claim 6, wherein said processing step comprises a rotation step of rotating the image data input by said input step and a conversion step of converting the image data rotated by said rotation step in accordance with the determination result by said determination step.

8. An image communication method according to claim 7, wherein said conversion step converts a resolution of the image data rotated by said rotation step.

9. An image communication method according to claim 8, further comprising a designation step, of designating a resolution of the image data to be transmitted by said transmission step, wherein said conversion step includes converting the resolution of the image data rotated by said rotation step when said determination step determines that the receiving side can not receive the image data of which resolution has been designated by said designation step.

10. An image communication method according to claim 9, further comprising selecting steps, of selecting a destination for transmitting the image data by said transmission step,
    wherein said selecting steps store the receiving capability obtained by communicating with the destination selected by said selecting steps corresponding to the destination.

11. An image communication apparatus, comprising:
    an input unit adapted to input image data;
    a memory adapted to store a receiving capability of at least one receiver side;

a determination unit adapted to determine the receiving capability of each receiver side using said memory;

a processing unit adapted to rotate and convert the image data input by said input unit in accordance with a determination result by said determination unit; and a transmitter adapted to transmit the image data processed by said processing unit to the receiver side.

12. An image communication apparatus according to claim 11, wherein said processing unit comprises a rotation unit adapted to rotate the image data input by said input unit, and a converter adapted to convert the image data rotated by said rotation unit in accordance with the determination result by said determination unit.

13. An image communication apparatus according to claim 12, wherein said converter is adapted to convert a resolution of the image data rotated by said rotation unit.

14. An image communication apparatus according to claim 13, further comprising a designation unit adapted to designate a resolution of the image data to be transmitted by said transmitter, wherein said converter converts the resolution of the image data rotated by said rotation unit when said determination unit determines that the receiving side can not receive the image data of which a resolution has been designated by said designation unit.

15. An image communication apparatus according to claim 14, further comprising a plurality of selecting units adapted to select a destination for transmitting the image data by said transmitter, wherein said selecting units are adapted to store the receiving capability obtained by communicating with the destination selected by said selecting units corresponding to the destination.

* * * * *

UNITED STATES PATENT AND TRADEMARK OFFICE
CERTIFICATE OF CORRECTION

PATENT NO. : 6,597,474 B1  Page 1 of 1
DATED : July 22, 2003
INVENTOR(S) : Takehiro Yoshida It is certified that error appears in the above-identified patent and that said Letters Patent is hereby corrected as shown below:

Column 6,
Line 1, "$O=(b.\ I_o+a.\ I_1)/(a+b)$." should read -- $O=(b \cdot I_o + a \cdot I_1)/(a+b)$. --.

Signed and Sealed this

Seventeenth Day of February, 2004

JON W. DUDAS
*Acting Director of the United States Patent and Trademark Office*